United States Patent [19]

Hilliard et al.

[11] 4,003,025

[45] Jan. 11, 1977

[54] ALPHABETIC CHARACTER WORD UPPER/LOWER CASE PRINT CONVENTION APPARATUS AND METHOD

[75] Inventors: John Joseph Hilliard, Potomac; Philip Joseph Mullan, Rockville; Walter Steven Rosenbaum, Silver Spring, all of Md.

[73] Assignee: International Business Machines Corporation, Armonk, N.Y.

[22] Filed: Dec. 24, 1975

[21] Appl. No.: 643,976

[52] U.S. Cl. .............. 340/146.3 S; 340/146.3 WD
[51] Int. Cl.² ......................................... G06K 9/00
[58] Field of Search .......... 340/146.3 S, 146.3 WD, 340/146.3 FT

[56] References Cited

UNITED STATES PATENTS

| | | | |
|---|---|---|---|
| 3,634,822 | 1/1972 | Chow | 340/146.3 S |
| 3,651,459 | 3/1972 | Hahn | 340/146.3 WD |

*Primary Examiner*—Joseph M. Thesz
*Attorney, Agent, or Firm*—J. Jancin, Jr.

[57] ABSTRACT

The print convention apparatus and method disclosed herein effects a decision making process with respect to a determination as to whether an alphabetic character field output from an optical character reader (OCR) is related to the OCR scan of an upper case or a lower case inscription on the document scanned. The alphabetic character field (e.g., a word) is comprised of one or a series of alphabetic characters which represent the OCR's interpretation of characters printed on the scanned document. Each word output by the OCR corresponds to a field (i.e., word) of characters imprinted on the scanned document. The electrical signals representative of the upper and lower case alphabetic characters and rejects including conflicts outputted from the OCR are applied to a character occurrence probability storage apparatus which contains precomputed empirical probabilities therein that: (1) a given character recognition is the result of the scan of an upper case character; and (2) a given character recognition is the result of the scan of a lower case character. In addition, the storage apparatus includes probability values for character conflicts and rejects. As the series of alphabetic character signals from the OCR output are applied character-by-character to the character occurrence probability storage apparatus (e.g., a read-only store), a running sum of the respective probabilities for the upper case and lower case print conventions is developed so that, following the input of the final character, reject or conflict within a word to the aforesaid apparatus, an appropriate upper or lower case determination can be made for all of the characters within the word. This determination corresponds with the print convention of the word inscribed on the scanned document. A corresponding upper or lower case flag is correspondingly generated with the print convention determination, and associated with the alphabetic character word output from the print convention apparatus for further text processing. In one embodiment of the invention the probability for each OCR output alphabetic character being an upper or lower case character is stored in respective upper and lower case character occurrence probability storage devices after having been precomputed as the product of two probability factors; i.e., (1) a first probability factor with respect to the likelihood that the OCR recognition resulted from the scan of an upper or lower case character, and (2) a second probability factor with respect to the likelihood of a given character occurring in a specified language (e.g., English) document. In another embodiment of the invention, the character occurrence probability storage devices are functionally replaced by a read-only store having an address position for each upper and lower case alphabetic character outputted by the OCR including conflicts and rejects, and a precomputed numerical probability value associated with each address position to represent the quotient of: (1) the probability that a given character is related to an upper case print convention; and (2) the probability that the same character is related to a lower case print convention.

7 Claims, 4 Drawing Figures

|   | A | B | C | D | E | F | G | H | I | J | K | L | M | N | O | P | Q | R | S | T |
|---|---|---|---|---|---|---|---|---|---|---|---|---|---|---|---|---|---|---|---|---|
| 1 A | 13 |  | 3252 |  | 3602 | 4082 |  |  | 3482 | 4082 |  | 3482 | 3300 | 3602 |  | 4082 |  | 3482 |  | 3778 |
| 2 B |  | 39 |  | 2954 | 2348 | 3252 |  |  |  |  |  |  |  |  |  |  |  | 2553 | 2893 | 2474 |
| 3 C |  |  | 17 |  | 2796 |  | 3194 |  | 3568 |  | 2893 |  | 3568 |  | 1362 |  | 3568 | 3268 | 3568 | 3092 |
| 4 D | 4046 | 3568 | 2169 | 53 | 2963 | 2446 | 3568 |  | 3721 |  | 3268 |  | 3553 |  | 4046 | 2664 |  | 3421 | 3721 |  |
| 5 E |  | 4046 | 3125 | 4046 | 17 | 28 |  |  |  |  |  |  |  |  |  |  |  |  |  |  |
| 6 F |  |  |  |  |  | 28 | 17 | 2936 |  |  | 2936 |  |  | 2936 |  | 2456 |  | 2936 |  | 2936 |
| 7 G | 3509 | 3509 | 2724 |  | 2900 |  |  | 21 | 3209 | 30 |  | 3509 | 2733 | 3509 |  |  |  |  | 3201 | 2411 |
| 8 H | 3700 |  |  |  | 3509 |  |  | 21 | 108 |  | 3700 | 2328 |  |  |  | 3042 |  | 3042 | 3509 |  |
| 9 I | 3046 | 3046 |  |  | 3215 |  |  |  |  |  |  |  |  |  |  | 3046 | 3046 | 3700 |  |  |
| 10 J |  |  |  |  |  |  |  |  |  |  |  |  |  |  |  |  |  |  |  |  |
| 11 K | 3482 | 4000 | 3482 | 3958 | 3357 | 3958 | 3410 | 2778 | 2731 | 3886 | 25 | 3959 | 2743 | 2367 | 3958 | 2951 |  | 2940 | 3482 | 3357 |
| 12 L | 3252 | 3536 | 1684 | 1562 | 2775 | 3432 |  | 3388 | 3252 |  | 2554 | 3922 | 3638 | 24 |  | 3523 | 3586 | 3721 | 3432 | 3721 |
| 13 M | 3700 |  | 3042 | 3042 | 3388 | 2343 |  |  | 3886 |  | 4000 | 3824 | 3824 | 3886 | 50 | 3194 |  | 3388 | 4000 | 3886 |
| 14 N |  |  | 1794 | 3328 | 3585 | 3041 | 3922 |  |  | 3824 |  |  |  |  |  |  |  |  | 3586 |  |
| 15 O |  |  | 3959 | 3523 |  |  |  | 3348 |  |  |  |  |  |  |  |  |  |  |  |  |
| 16 P |  |  | 2890 |  | 3638 |  |  | 3922 | 3959 |  | 3168 |  |  | 3347 | 3042 | 11 |  |  | 3638 | 3959 |
| 17 Q |  |  |  |  | 3922 |  |  |  | 2883 | 2708 |  | 2584 |  | 3638 | 478 | 2904 | 288 | 3721 | 12 | 20 |
| 18 R | 3922 | 3959 |  |  | 3824 |  |  |  |  | 2783 |  | 3087 | 3187 | 3922 | 3554 |  |  | 23 |  |  |
| 19 S | 3824 | 3922 |  |  |  |  |  | 3187 | 3482 | 3432 |  |  | 2584 | 3824 | 3824 |  |  | 3824 |  | 3087 |
| 20 T |  |  |  | 3087 | 2783 |  | 3168 | 2584 | 2697 |  | 1522 | 3000 |  | 3187 | 3187 | 3482 |  | 3187 | 3482 |  |
| 21 U |  |  |  |  |  |  |  |  | 3168 |  |  |  |  | 3037 |  |  |  |  | 3000 |  |
| 22 V | 3000 |  |  |  |  |  |  |  |  |  |  |  |  | 2144 |  |  |  |  |  | 3168 |
| 23 W |  |  |  |  |  |  |  |  |  |  |  |  |  |  |  |  |  |  |  |  |
| 24 X |  |  |  |  |  |  |  |  |  |  |  |  |  |  |  |  |  |  |  |  |
| 25 Y |  |  |  |  |  |  |  |  |  |  |  |  |  |  |  |  |  |  |  |  |

Please Note: A value of 5000 is ascribed to each blank position in this Table.

TABLE II

TABLE III

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| 26 z | 2300 | | | | | | | | | | | | | | | | | | | |
| 27 a | | | 26 | | 2186 | | 3252 | | | | | | | | | | | | | |
| 28 b | | | 2482 | 2186 | 2268 | | 2397 | | | | | | | | | | | | | |
| 29 c | | 3377 | 2335 | | | | 3377 | | | | | | | | | | | | | |
| 30 d | | | | | | | | | | | | | | | | | | | | |
| 31 e | | | | | | | | | | | | 3252 | | | 2954 | | | | | |
| 32 f | | | | | | | | | | | | | | | 2883 | | | 3377 | 3082 | |
| 33 g | | | | | | | | | | | | | | | 2397 | | | | | |
| 34 h | | | | | | | | | | | | | | | 2904 | | | | | |
| 35 i | 3126 | | | | | | | | | | | | | | 2335 | | | | | |
| 36 j | | | 3250 | | | | | | 2278 | | | 3126 | 3126 | | | | | | | |
| 37 k | | | 2079 | | | | | | 2660 | | | 2417 | 2364 | | | 3250 | | | | |
| 38 l | | | 2836 | 2313 | | | | | 2462 | | | 2462 | | 2432 | 2326 | | | | 2664 | 2221 |
| 39 m | | | | | | 2955 | | | 2955 | | | 2396 | 2506 | | | | | | | |
| 40 n | 3250 | | | | | | | | | | | | | | | | | | | |
| 41 o | | | | | 3260 | | | | | | | | | | | | | | 2858 | 3155 |
| 42 p | | | | | 2836 | | | | | | | | | | 36 | 25 | | | 33 | 3260 |
| 43 q | | | | | 2996 | | | | | | | | | | | | | | | |
| 44 r | | 2293 | | | | | | | | 2582 | 2192 | | | 2270 | 2836 | | | | | |
| 45 s | | 2996 | | | | | 2582 | | 2494 | | | | | 2535 | | | | | 2494 | |
| 46 t | | | | | | | | | | | | | | | | | | | | |
| 47 u | | | | | | | | | | | | | | | | | | | | |
| 48 v | | | | | | | | | | | | | | | | | | | | |
| 49 w | | | | | | | | | | | | | | | | | | | | |
| 50 x | | | | | | | | | | | | | | | | | | | | |
| 51 y | | | | | | | | | | | | | | | | | | | | |
| 52 z | | | | | | | | | | | | | | | | | | | | |

Please Note: A value of 5000 is ascribed to each blank position in this Table.

TABLE IV

| | U | V | W | X | Y | Z | a | b | c | d | e | f | g | h | i | j | k | l | m |
|---|---|---|---|---|---|---|---|---|---|---|---|---|---|---|---|---|---|---|---|---|
| 1 A | | | 3602 | 4082 | | | 2500 | | | | 3478 | | 3252 | | | | 4081 | | |
| 2 B | 2870 | | | 3495 | | | | 2553 | | | 2951 | | 3495 | 4081 | | | | | |
| 3 C | | | | | | | | | | 2867 | 3495 | | 3268 | | | | | | |
| 4 D | | | | | | | | | | | | | 4027 | | | | | | 4027 |
| 5 E | | 3509 | 3252 | | 4046 | | 4027 | 3092 | | | | | | 4027 | 3252 | | | 2900 | |
| 6 F | 2347 | | 3509 | 3700 | | 3700 | | 3201 | | | 2558 | 2932 | 3201 | 2261 | 3509/1443 | 3700/2045 | | 1594 | |
| 7 G | | 3721 | | 3237 | | | | | | | 3201 | | | | | | | | |
| 8 H | 3958 | | 3125/3092/3586 | 3721/4000 | 3347 | | 3415 | | | | | | | 3252/3996 | 3114/3252/3693/3843 | | 2008/3959/3431 | 2358/3731/3693 | 2686/3693/3843 |
| 9 I | 2323 | | | | | 3347/3959 | 3000/3947 | 3893 | | | 3731 | | 3843 | 3468 | 3343 | 3843 | 3843 | 3947 | 3646 |
| 10 J | | | | | | | | | | | | | | | | | | | |
| 11 K | | | | | 3357 | | | 3932 | | | 3192 | | 3947/3932 | | 3932/2793 | | 2833/3932 | 2421 | 3836 |
| 12 L | 3959 | 3357 | | 3959 | | | | | | | | | | | | | | | |
| 13 M | | | | | | | | | | | | | | | | | | | |
| 14 N | | | | | 2608 | | | | | | | | | 2788 | | | | | |
| 15 O | | | | 2886 | 3000/20 | | | 3187 | | | | | | 3170 | | | 3487 | | |
| 16 P | | | 2886/2336/40 | | | | | | | | | | | | | | | | |
| 17 Q | | | | 79 | | | | | | | | | | | | | | | |
| 18 R | 24/3087 | 22 | | | | | | | | | | | | | | | | | |
| 19 S | 2697 | 2024 | | | | | | | | | | | | | | | | | |
| 20 T | | | | | | | | | | | | | | | | | | | |
| 21 U | | | | | | | | | | | | | | | | | | | |
| 22 V | | | | | | | | | | | | | | | | | | | |
| 23 W | | | | | | | | | | | | | | | | | | | |
| 24 X | | | | | | | | | | | | | | | | | | | |
| 25 Y | | | | | | | | | | | | | | | | | | | |

Please Note: A value of 5000 is ascribed to each blank position in this Table.

TABLE V

| | u | v | w | x | y | z | a | b | c | d | e | f | g | h | i | j | k | l | m |
|---|---|---|---|---|---|---|---|---|---|---|---|---|---|---|---|---|---|---|---|
| 26 z | | | | | | 22 | 25 | | | | | | | | 3084 | | | | |
| 27 a | | | | | | | | | | 2397 | 2783 | | | 1708 | | | 3377 | 3377 | |
| 28 b | | | | | | | 2191 | 36 | 26 | 40 | 2397 | | | | | | | | |
| 29 c | | | | | | | 2780 | | | | 20 | 85 | 73 | | | | | 1443 | |
| 30 d | | | | | | | | | | | 1870 | | | 15 | 38 | | | | |
| 31 e | | | | | | | | | | | | | | | 2435 | 600 | | | |
| 32 f | 2822 | | | | | | | | | | | | | | 1564 | | 21 | 55 | 46 |
| 33 g | | | | | | | | | | | | | | | 2734 | | | | 2861 |
| 34 h | | | 3082 | | 3126 | | | | | | | | | | | | | | 3158 |
| 35 i | | | | 2326 | | | 3263 | | | 3336 | 3263 | | 3336 | | | | | | |
| 36 j | | | 2335 | | | | | | | | | | | | | | | | |
| 37 k | | | | | | | | 2857 | | | | | | | | | | | |
| 39 m | | | | | | | | | | | 2857 | | | | | | | | |
| 40 n | | | | | | 3620 | 2857 | | | | | | | | 3260 | | | | |
| 41 o | | | | | | | | | | | | | 1000 | | | | | | |
| 42 p | | | | 2955 | | 3260 | | | | | 2662 | | 2839 | | | | | | 1967 |
| 43 q | | | | | | | 2536 | | | 2996 | 2996 | | | | 2996 | | | | |
| 44 r | | 2506 | | | | | | | | | | | | | 1810 | | | | |
| 45 s | | 32 | | | | | | | | | | | | | | | | | |
| 46 t | | 2234 | 43 | 37 | 2494 | | 2508 | | | 2508 | | | | 2508 | | | | | |
| 47 u | 50 | | | | | | | | | | | | | | | | | | |
| 48 v | | 1736 | | | 1805 | | | | | | | | | | | | | 2494 | |
| 50 x | | | | | | 43 | | | | | | | | | | | | 3000 | |
| 51 y | | | | 1435 | | | | | | | | | | | | | | | |

Please Note: A value of 5000 is ascribed to each blank position in this Table.

TABLE VI

| | n | o | p | q | r | s | t | u | v | w | x | y | z | * | # | @ | ? |
|---|---|---|---|---|---|---|---|---|---|---|---|---|---|---|---|---|---|
| 1 A | 4081 | | | | | | | | | | | | | 2155 | 2064 | 3155 | 4000 |
| 2 B | | | | | | | | | | | | | | 1370 | 2137 | 3155 | 4000 |
| 3 C | 2722 | | | | | | | | | | | | | 1830 | 2432 | 3155 | 4000 |
| 4 D | | | | | | | | | | | | | | 1519 | 2009 | 3097 | 4000 |
| 5 E | | | | | | | | | | | | | | 1752 | 2958 | 3155 | 4000 |
| 6 F | | | | | | | | | | | | | | 1700 | 1824 | 3155 | 4000 |
| 7 G | | | | | | | | | | | | | | 1676 | 2456 | 3155 | 4000 |
| 8 H | 3509 | | | | | | | | | | | | | 2156 | 1786 | 3155 | 4000 |
| 9 I | | | | | | | | | | | | | | 1518 | 2237 | 1013 | 1936 |
| 10 J | | | | | | | | | | | | | | 1587 | 1936 | 2543 | 4000 |
| 11 K | | | | | 3495 | | 3569 | | | | | | | 2328 | 1826 | 3155 | 4000 |
| 12 L | 3237 | | | | 3550 | | 3425 | | | | | | | 1944 | 2638 | 2482 | 3301 |
| 13 M | | | | | 2455 | | | | | | | | | 1842 | 1212 | 3155 | 4000 |
| 14 N | 2652 | | | | | | | | | | | | | 2678 | 1550 | 3522 | 4000 |
| 15 O | 2688 | | | | 3215 | | 3509 | | | | | 3046 | | 1668 | 1827 | 3155 | 4000 |
| 16 P | | | | | 3482 | | 3458 | | | | | | | 2149 | 2538 | 3155 | 4000 |
| 17 Q | | | | 794 | 3731 | | 3640 | | | | | 3731 | | 1367 | 1668 | 3155 | 4000 |
| 18 R | | | | | 3843 | | | | | | | 3843 | | 2114 | 1687 | 3522 | 4000 |
| 19 S | 2867 | | | | 3343 | | | | | | | | | 1877 | 3523 | 3155 | 4000 |
| 20 T | | | | | | | | | | | | | | 2137 | 1830 | 3222 | 4000 |
| 21 U | | | | | 2448 | | 3646 | | | | | 3836 | | 2042 | 1632 | 2886 | 4000 |
| 22 V | | | | | | | | | | | | 3084 | | 2853 | 1564 | 3155 | 4000 |
| 23 W | | | | | 2992 | | 2475 | | | | | 3487 | | 2421 | 1226 | 3155 | 4000 |
| 24 X | | | | | | | | | | | | | | 1788 | 1034 | 3155 | 4000 |
| 25 Y | | | | | | | | | | | | 2569 | | 2237 | 1733 | 3155 | 4000 |

Please Note: A value of 5000 is ascribed to each blank position in this Table.

| | n | o | p | q | r | s | t | u | v | w | x | y | z | * | # | @ | ? |
|---|---|---|---|---|---|---|---|---|---|---|---|---|---|---|---|---|---|
| 26 z | 3084 | | | | | | | | | | | 3384 | | 1442 | 1442 | 3155 | 4000 |
| 27 a | | | | | | | | | | | | | | 1523 | 1420 | 3155 | 4000 |
| 28 b | 2668 | | | | | | | | | | | | | 1407 | 2402 | 3155 | 4000 |
| 29 c | | | | | | | | | | | | | | 2328 | 1552 | 3155 | 4000 |
| 30 d | | | | | | | | | | | | | | 1209 | 2586 | 3155 | 4000 |
| 31 e | 2435 | | | | | | | | | | | | | 1678 | 3046 | 3155 | 4000 |
| 32 f | | | | | | | | | | | | | | 1695 | 1209 | 3155 | 4000 |
| 33 g | | | | | 1870 | | | | | | | | | 958 | 2000 | 3155 | 4000 |
| 34 h | | | | 2334 | | | | | | | | | | 2600 | 1794 | 3155 | 2388 |
| 35 i | | | | | | | | | | | | | | 1637 | 2087 | 3155 | 2794 |
| 36 j | 1550 | | | | | | | | | | | | | 300 | 1000 | 3155 | 4000 |
| 37 k | 21 | | | | | | | | | | | | | 1549 | 2222 | 3155 | 4000 |
| 38 l | | | | | | | | | | | | | | 1522 | 1658 | 2886 | 1886 |
| 39 m | | | | 156 | | | | | | | | | | 1448 | 1925 | 3155 | 4000 |
| 40 n | | | 25 | | 2861 | | | | | | | | | 2009 | 1760 | 3155 | 4000 |
| 41 o | | 36 | | | | | | | | | | | | 1864 | 1706 | 3155 | 4000 |
| 42 p | | | | | 22 | 33 | | | | | | | | 1522 | 1103 | 3155 | 4000 |
| 43 q | | | | | | | 3260 | | | | | | | 1000 | 1000 | 3155 | 4000 |
| 44 r | | | | | | | 24 | | | | | | | 1939 | 1765 | 3155 | 4000 |
| 45 s | | | | | | | | 50 | | | | | | 1524 | 2301 | 3155 | 4000 |
| 46 t | 2535 | | | | 2996 | | | | 32 | | | | | 1662 | 2143 | 3155 | 4000 |
| 47 u | | | | | | | | | | 43 | | | | 1428 | 1736 | 3155 | 4000 |
| 48 v | | | | | 2535 | | | | | | 37 | | | 2155 | 1425 | 3155 | 4000 |
| 49 w | | | | | | | | | | | | 38 | | 2276 | 1208 | 3155 | 4000 |
| 50 x | | | | | 2583 | | | | | | | | 43 | 1830 | 1522 | 3155 | 4000 |
| 51 y | | | | | | | | | | | | | | 2023 | 1715 | 3155 | 4000 |
| 52 z | | | | | | | | | | | | | | 1639 | 1639 | 3155 | 4000 |

TABLE VII

Please Note: A value of 5000 is ascribed to each blank position in this Table.

ALPHABETIC CHARACTER WORD UPPER/LOWER CASE PRINT CONVENTION APPARATUS AND METHOD

FIELD OF THE INVENTION

This invention disclosed herein relates to data processing systems for the analysis of characters outputted from an optical character reader (OCR).

BACKGROUND OF THE INVENTION

Most alphabetic characters have highly differing misread propensities based upon the alphabetic upper or lower case in which they are printed on the document scanned by an OCR. This is readily evident from an examination of the significantly different geometry in most upper and lower case characters; for example, A, a; E, e; G, g; and so on. It has been discovered that the overall OCR post-processing error correction function is enhanced by a preprocessing step within that function to determine the upper or lower case print convention in which the alphabetic characters within a word were inscribed on the document scanned by the OCR. This preprocessing step enhances the accuracy and reliability of the total overall OCR post-processing error correction function.

The utility of the subject invention can be seen in its preprocessing role with respect to the error correction apparatus disclosed and claimed in the copending patent application entitled "Regional Context Maximum Likelihood OCR Error Correction Apparatus," Ser. No. 600,743, which was filed on July 30, 1975 as a continuation-in-part to Ser. No. 459,820, which was filed on Apr. 10, 1974. The system disclosed therein selects the correct form of a garbled input word misread by an OCR so as to change the number of characters in the word by character splitting or concatenation. Dictionary words are stored in the system. The vastly different alphabetic character confusion propensities dependent upon whether a given character inscription would be in upper or lower case print convention, emphasizes the important utility of the subject invention in its determination as to whether an alphabetic character field (i.e., word) output from an OCR is related to the scan of an upper case or a lower case field inscription on the document scanned.

OBJECTS OF THE INVENTION

It is an object of the invention to process textual data output from an OCR in an improved manner.

It is another object of the invention to discriminate between alphabetic character fields (e.g., words) scanned by an OCR with respect to the upper/lower case print convention in which the alphabetic characters were inscribed on the document scanned by the OCR.

It is another object of the invention to discriminate between such alphabetic character fields without the need of a stored dictionary of permissible received messages.

DESCRIPTION OF THE DRAWINGS

The foregoing and other objects, features, and advantages of the invention will be apparent from the following description of the preferred embodiments of the invention, as illustrated in the accompanying drawings.

SUMMARY OF THE INVENTION

Figure 1:
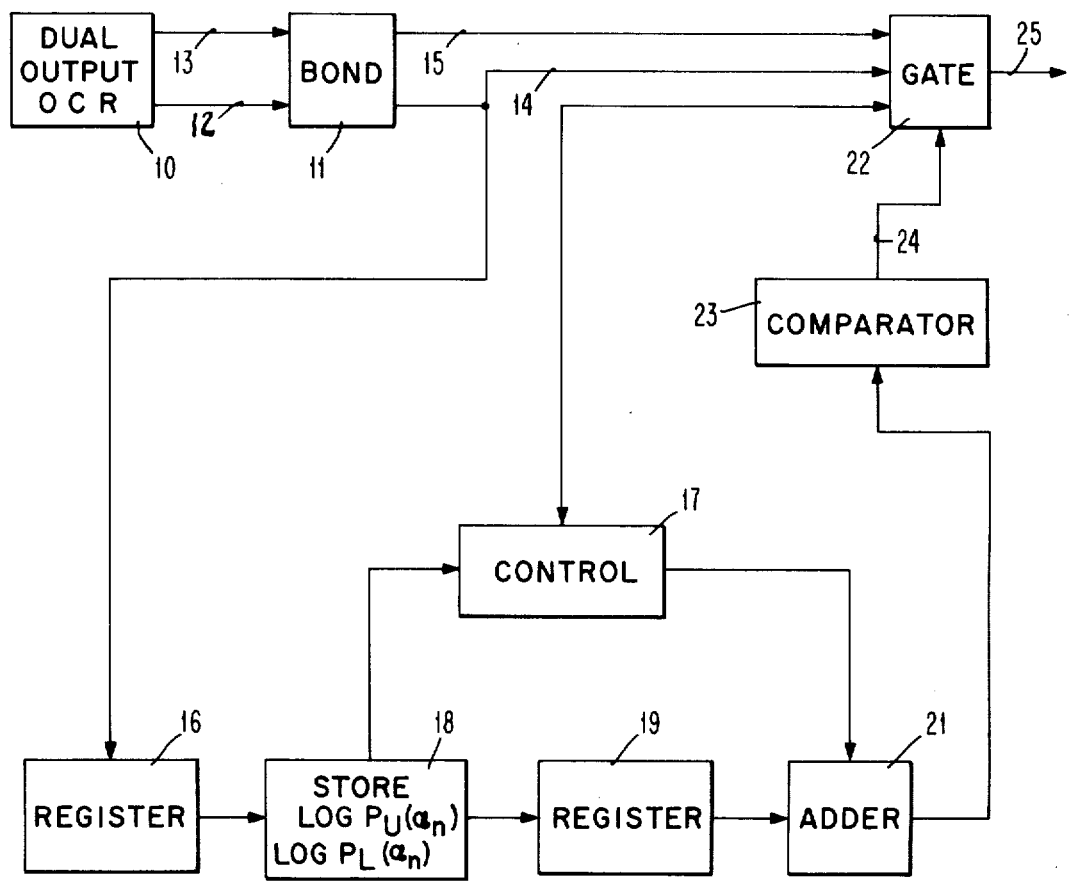
FIG. 1 displays diagrammatically in block diagram fashion the alphabetic character upper/lower case print convention discriminating apparatus.

A so-called print convention index (PCI) developed by the apparatus and through the method of the subject invention, is a decision function formulation for the purpose of implying upper or lower case character words. For purpose of such general OCR applications as mail designation reading and text processing, for example, there are the following three print conventions to be considered with respect to the PCI operation: i.e., (1) all characters within a word are upper case print convention; (2) all characters within a word are lower case characters; and (3) all characters within a word are lower case except for the first character in the word which is upper case print convention.

The discrimination between these three print conventions is not trivial because an OCR misread (including conflicts and rejects) tends to confuse alphabetic character upper and lower case print conventions as well as character identity. OCR conflicts and rejects normally contain no print convention case inference with respect to the character(s) scanned.

The alphabetic character upper/lower case decision is made on a per field (i.e., word) basis using the PCI formulation set forth in the following equation (1):

$$PCI = \sum_{n=1}^{k-1} \log P_U(\alpha_n) - \sum_{n=1}^{k-1} \log P_L(\alpha_n) \qquad (1)$$

where $k$ is the number of alphabetic characters in the field; "$\alpha$" is the alphabetic character that has been recognized in the nth position in the field of alphabetic characters; and $n$ is an index which is incremented with respect to the subject field, from right to left (i.e. $n = 1$ at the last, furthest-to-the-right character position in the field). Accordingly, and by way of example, in the field of characters "Smith"; "$k$" = 5; the characters S and h represent the left-to-right direction of characters; and "$n=1$" (see above) is associated with the character h.

An upper case print convention is implied if the PCI value in equation (1) is greater than 0, and a lower case print convention is implied if the PCI value is equal to or less than 0. This "+" and "−" type assignment i purely arbitrary relative to the operation of the invention.

The expression "$P_U(\alpha_n)$" in equation (1) is representative of the probability that the OCR recognition α resulted from the scan of an upper case alphabetic character. Correspondingly, the expression $P_L(\alpha_n)$ i equation (1) is representative of the probability that the OCR recognition $\alpha_n$ resulted from the scan of a lower case alphabetic character. The complete set of $\alpha$'s cover all alphabetic upper and lower case characters, and may include conflict recognition rejects as well as the general alphabetic character reject code.

The values for the $P_U(\alpha_n)$ and $P_L(\alpha_n)$ expressions are stored in logarithmic form for purpose of equation (1) after having been precomputed by the formulation in equations (2) and (3), respectively:

$$P_U(\alpha_n) = \sum_{i=1}^{26} P_c[\alpha_n|U(i)] \cdot P[U(i)] \quad (2)$$

$$P_L(\alpha_n) = \sum_{i=1}^{26} P_c[\alpha_n|L(i)] \cdot P[L(i)] \quad (3)$$

where "U(i)" is the 1-26 "i"th upper case alphabetic character; "L(i)" is the 1-26 ith lower case alphabetic character; $P_c[\alpha_n|U(i)]$ is the confusion probability of U(i) being read as $\alpha_n$; P[U(i)] is the probability of U(i) occurring on the scanned document because of the language (e.g., English) of the word inscribed on the document scanned; $P_c[\alpha_n|L(i)]$ is the confusion probability of L(i) being read as $\alpha_n$; and P[L(i)] is the probability of L(i) occurring in the scanned document because of the language in which the words scanned by the OCR is inscribed on the document.

Table I herein sets forth the frequency of occurrence of alphabetic character letters in the English language so that, for example, the frequency of occurrence of the character A is 7.81%; of the character M is 2.62%; of the character T is 9.02%; and so on through to character Z at a frequency of occurrence of 0.09%. The alphabetic upper and lower case occurrence rates P[U(i)] and P[L(i)], respectively, are derived by applying a 20/80 scaling rule for textual documents and a 70/30 scaling rule for postal documents, respectively, to the frequency data provided in Table I. Accordingly, the relative P[U(i)] value for an upper case character in a textual document is 20% of the frequency value in Table I, whereas the P[L(i)] value for a textual document lower case character is 80% of the Table I value. On the other hand, the values of P[U(i)] and P[L(i)] are 70% and 30%, respectively, of the Table I value for a given upper or lower case character, respectively, if the document scanned by the OCR is in a postal designation reading application. The scaling rules are essentially arbitrary in terms of the exact scaling rule values used, and are empirical from the standpoint of knowledge gained through experience that a great majority of postal designation characters are imprinted in the upper case, whereas a majority of textual document characters are imprinted in the lower case print convention.

TABLE I

| A/a = 7.81% | N/n = 7.21% |
|---|---|
| B/b = 1.28% | O/o = 8.21% |
| C/c = 2.93% | P/p = 2.15% |
| D/d = 4.11% | Q/q = 0.14% |
| E/e = 13.05% | R/r = 6.64% |
| F/f = 2.88% | S/s = 6.46% |
| G/g = 1.39% | T/t = 9.02% |
| H/h = 5.85% | U/u = 2.77% |
| I/i = 6.77% | V/v = 1.00% |
| J/j = 0.23% | W/w = 1.49% |
| K/k = 0.42% | X/x = 0.30% |
| L/l = 3.60% | Y/y = 1.51% |

TABLE I-continued

| M/m = 2.62% | Z/z = 0.09% |
|---|---|

Referring to Tables II through VII in the appendix hereto, the Y-axis data are representative of the upper and lower case alphabetic characters imprinted on the document scanned by the OCR, whereas the X-axis characters pertain to the OCR upper and lower case character output. Additionally, the X-axis includes three conflict recognition categories (see Tables VI and VII) which are denoted by the OCR in its output as "@", "?", and " # ". Specifically, the conflict recognitions are:

1. i/1 — The i and 1 recognition circuits within the OCR are both turned on; however, the character is more reminiscent of i than 1. In the confusion data, this is denoted by @.

2. 1/i — The 1 and i logics again are both turned on; however, the recognition is more reminiscent of 1 than i. In the confusion data, it is denoted by ?.

3. N/W — A recognition is indeterminant; however, characterized by what is interpreted as a strong diagonal tendency. In the confusion data, this is denoted by The reject character notation * indicates that the recognition was non-conclusive and no character identification could be made.

Referring again to Tables II through VII, and with reference to equation (1) hereinabove, the PCI for the alphabetic character outputted by the OCR as an upper case A (see X-axis A), for example, would be the difference between: (1) the sum of the respective A column decimal equivalent probability values, each multiplied by its frequency of occurrence, for the Y-axis A–Z rows; and (2) the sum of the respective A column decimal equivalent probability values, each multiplied by its frequency of occurrence, for the Y-axis a–z rows. If the PCI value so derived is greater than zero, the implication is that the character scanned is upper case; whereas if the PCI value is equal to, or less than, zero, the implication is a lower case character. If the running sum PCI for the several alphabetic characters (including conflicts and rejects) in a word is indicative of an upper case print convention, the entire word will be treated as upper case print convention. On the other hand, if the running sum PCI for all characters in a word is indicative of a lower case print convention, the left-most character (i.e., the first character in the field) is to be treated separately from the characters in the remainder of the field which of course are treated as lower case.

DISCUSSION OF THE PREFERRED EMBODIMENTS

Referring to FIG. 1, a dual output OCR 10 is connected to a Bayesian Online Numeric Discriminant (BOND) of the type disclosed in Chaires et al. U.S. Pat. No. 3,839,702, which issued on Oct. 1, 1974. OCR 10 is connected to BOND 11 by the OCR alphabetic character output line 12 and the numeric character output line 13. It will be recognized by those skilled in the art that the BOND 11 is not necessary for the practice of the subject invention. The output of BOND 11 is effectively the alpha/numeric discrimination disclosed in the aforementioned Chaires et al. patent. The discrimination is such that the electrical signals pertaining to the series of alpha characters appear along BOND output line 14, whereas the signals pertaining to the series of numeric characters appear on BOND output line 15. A register 16 functions as a storage buffer for the series of alphabetic characters in a field. Under the direction of control 17, register 16 sequentially outputs a series of alphabetic characters to address a probability store 18 on a one-at-a-time character basis. Storage 18 contains both upper and lower case occurrence probability constituents of equation (1) herein for each alphabetic character outputted by OCR 10 through BOND 11. The effective values of both upper and lower case probabilities for a given character are outputted to register 19, and directed to logarithmic adder 21 which functionally calculates the sum of all of the upper case probabilities and all of the lower case probabilities for alphabetic characters in a given field in accordance with equation (1). The sum of these probabilities is determinative of the field or word PCI value discussed previously.

Gate 22 serves as a buffer storage for the numeric character field outputted on line 15 and the alphabetic character field outputted on line 14. Gate 22 also provides an appropriate signal to control 17 as to the position of characters and blanks in the alphabetic and numeric fields. Adder 21 outputs the upper and lower case print convention subtotals, to comparator 23 which compares the relative magnitudes of the subtotals in order to arrive at the PCI value. If, as stated herein previously, the PCI value is greater than zero, the signal on line 24 will cause an upper case print convention flag to be associated with the alphabetic characters in the field outputted as a series of alphabetic characters from BOND 11 along line 14 through gate 22 and onto output line 25. On the other hand, if the PCI value in comparator 23 is equal to, or less than, zero, the signal on line 24 will cause a lower case print convention flag to be associated with the alphabetic character field passing through gate 22 from line 14 to output line 25. It should be recognized that the "greater than" and "lesser than" zero designations for print convention are arbitrary in choice, and are not limitations of the invention. They do, however, represent "polarities" indicative of upper/lower case print conventions.

Figure 2:
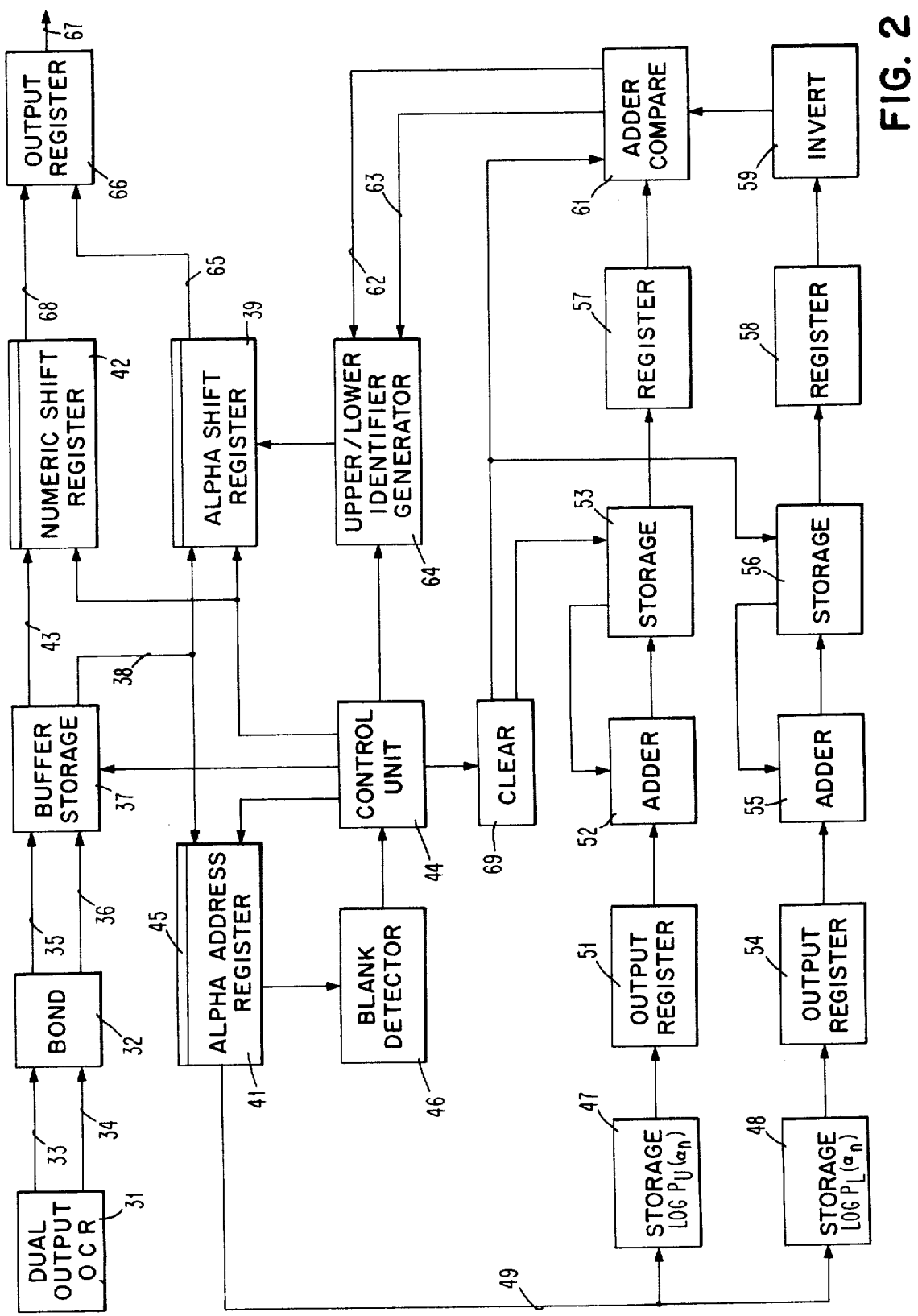
FIG. 2 is a detailed block diagram of one embodiment of the invention wherein a pair of character occurrence probability storage devices are sequentially accessed by the series of alphabetic characters outputted by the OCR.

Referring to FIG. 2, dual output OCR 31 is connected to BOND 32 by OCR output lines 33 and 34. The BOND 32 is connected on its output side by lines 35 and 36 to buffer store 37. As discussed previously in connection with FIG. 1, one BOND output line is used to transmit character fields or words flagged as numeric (e.g., line 35), and the other output line is used to transmit character fields flagged as alphabetic (e.g., output line 36). It will be clear to those skilled in this art that it is within the spirit of the invention to input directly from an OCR to the upper/lower case print convention apparatus which is the subject of this invention without of necessity utilizing the BOND apparatus. Thus, and by way of example, the OCR output line 33 (FIG. 2) could be connected directly to line 35 which is input to buffer storage 37, and OCR output line 34 could also be connected to line 36, thereby effectively bypassing BOND 32.

The alphabetic character field output from buffer store 37 appears on line 38 for transmittal to alphabetic character shift register 39 and storage address register 41. The numeric output from buffer 37 is directed to numeric character shift register 42 along line 43. The control unit 44 initiates this process and maintains the output sequence of numeric and alphabetic fields identical to the input sequence of the character fields to the print convention apparatus. Accordingly, the numeric field character stream is directed to register 42 one character at a time, and the alphabetic field character stream is directed to registers 39 and 41 in parallel and one character at a time. At the input cell 45 for register 41, a line is connected to blank detector 46 for the purpose of testing the presence of a blank field or word separation "character". Upon detection of a blank, the decision process of the invention is activated by control unit 44.

Detection of a blank at input cell 45 of shift register 41 results in the alphabetic field character stream being shifted into register 41 at a rate of one character at a time. concurrently, each character in the alphabetic character field is sequentially loaded into register 39. The alphabetic character(s) stored in register 41 embodies the storage address for the upper case probabilities log $P_U(\alpha_n)$ in the store 47, and the lower case probabilities log $P_L(\alpha_n)$ in the store 48. The tables of upper and lower case occurrence probabilities are formed as described previously with respect to equation (1). These probabilities are stored in the storage units 47 and 48. As stated previously, the occurrence probability values in stores 47 and 48 are accessed by the alphabetic character appearing along line 49 from register 41.

The upper case occurrence probability values log $P_U(\alpha_n)$ sequentially stored in output register 51 are sequentially added by adder 52 to the sequentially updated log $P_U(\alpha_n)$ contents of storage register 53. The addition process continues in chain fashion until the sum of the upper case occurrence probability values has been calculated for the alphabetic character field stored in shift register 41 in accordance with equation (1). The end of the field is detected by testing for the terminating blank at the input cell position 45 of register 41.

Simultaneously, the lower case occurrence probability values log $P_L(\alpha_n)$, are stored in output register 54, and then sequentially added by adder 55 to the sequentially updated log $P_L(\alpha_n)$ contents of storage register 56. This addition process continues in chain fashion until the sum of the lower case occurrence probability values has been calculated for the alphabetic character subfield stored in shift register 41 in accordance with equation (1).

The sum of the upper case occurrence probabilities for a given field or word stored in storage register 53 are transferred to the register 57, whereas the sum of the lower case occurrence probabilities for a given field and stored in storage register 56, are transferred to register 58. The contents of register 58 are inverted in algebraic sign by inverter 59, and added to the contents of register 47 in adder-comparator 61. The output of unit 61 determines the print convention index. If the sum in unit 61 is greater than zero, output line 62 will be activated so as to imply that the character field is in upper case. If the sum within adder-comparator 61 is less than, or equal to, zero, the output line 63 is activated; the implication being that the character field or word is in lower case. As shown in FIG. 2, lines 62 and 63 are input to the upper/lower case identifier generator 64 which, upon command from control unit 44, generates either an upper or a lower case data flag depending upon which of the lines 62 or 63 was activated. This flag is appended to the alphabetic character field in shift register 39. Upon command from control 44, the contents of shift register 39 are output along line 65 to the output register 66 and print convention apparatus output line 67. Accordingly, and by way of summary, the alphabetic character field stored in register 39 will, dependent upon the activation of lines 62 or 63, be output with either an upper or a lower case flag associated therewith. The numeric character field is output as described previously from shift register 42 into output register 66 along the register output line 68. The clear unit 69 under direction of control unit 44 effectively resets storage units 53 and 56, and adder-comparator 61, as the system completes its operation with respect to one field or word, and prepares to receive another grouping of characters.

Figure 3:
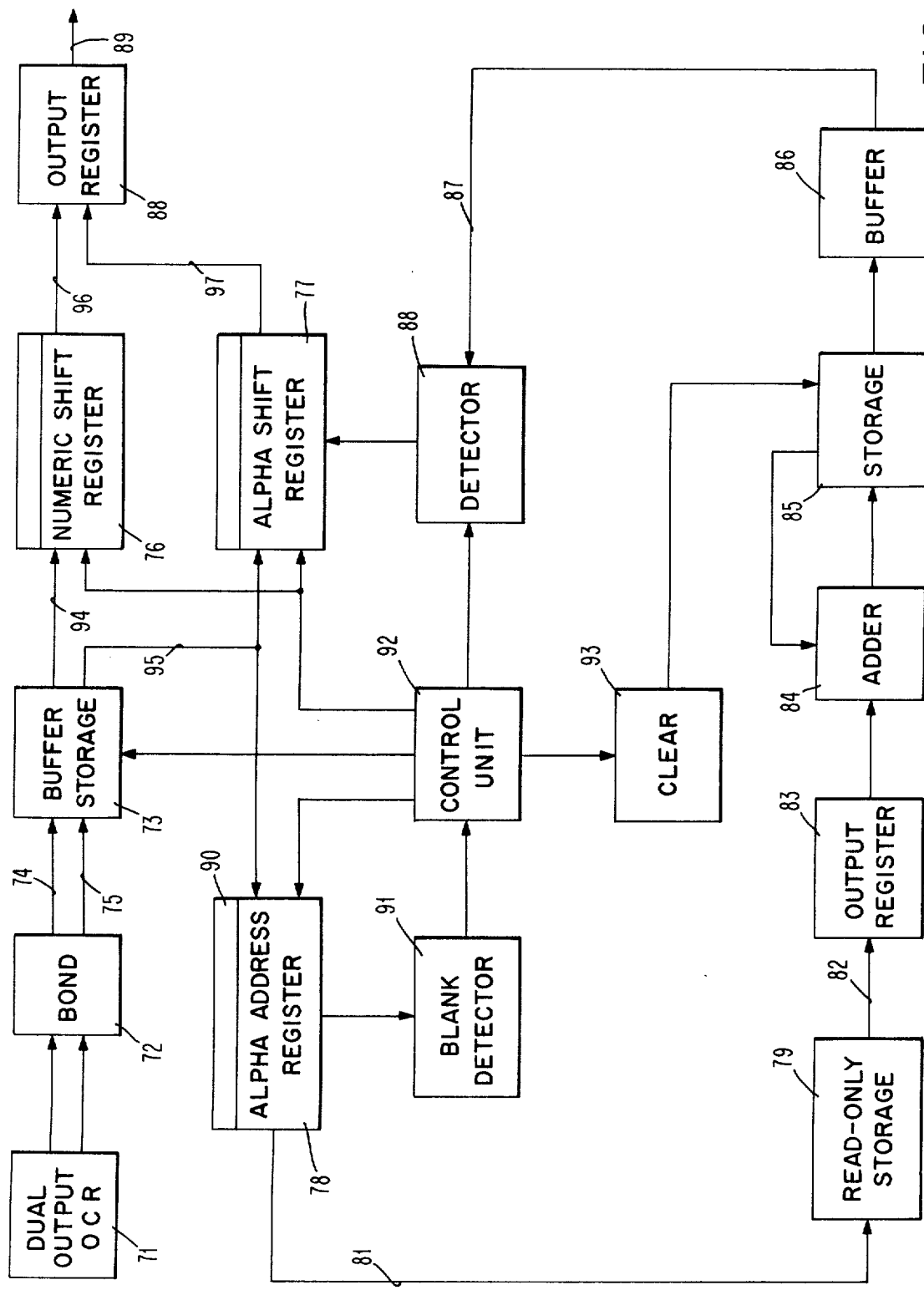
FIG. 3 is a detailed block diagram of another embodiment of the invention wherein a read-only character occurrence probability storage apparatus is employed to provide the print convention index (PCI) value at its output for each alphabetic character outputted by the OCR.

Referring to FIG. 3, the output of OCR 71 is applied to BOND 72 whose numeric and alphabetic character output is directed to buffer store 73 along lines 74 and 75, respectively. As described previously in connection with FIG. 2, the numeric character output from store 73 is transmitted along line 94 to register 76, whereas the alphabetic character output from store 73 is directed to registers 77 and 78 via line 95. Input cell 90 is a part of register 78.

Read-only store (ROS) 79 contains therein the PCI value for each upper case and each lower case alphabetic character output from register 78 along line 81. It also contains the PCI value for conflicts ad rejects.

Figure 4:
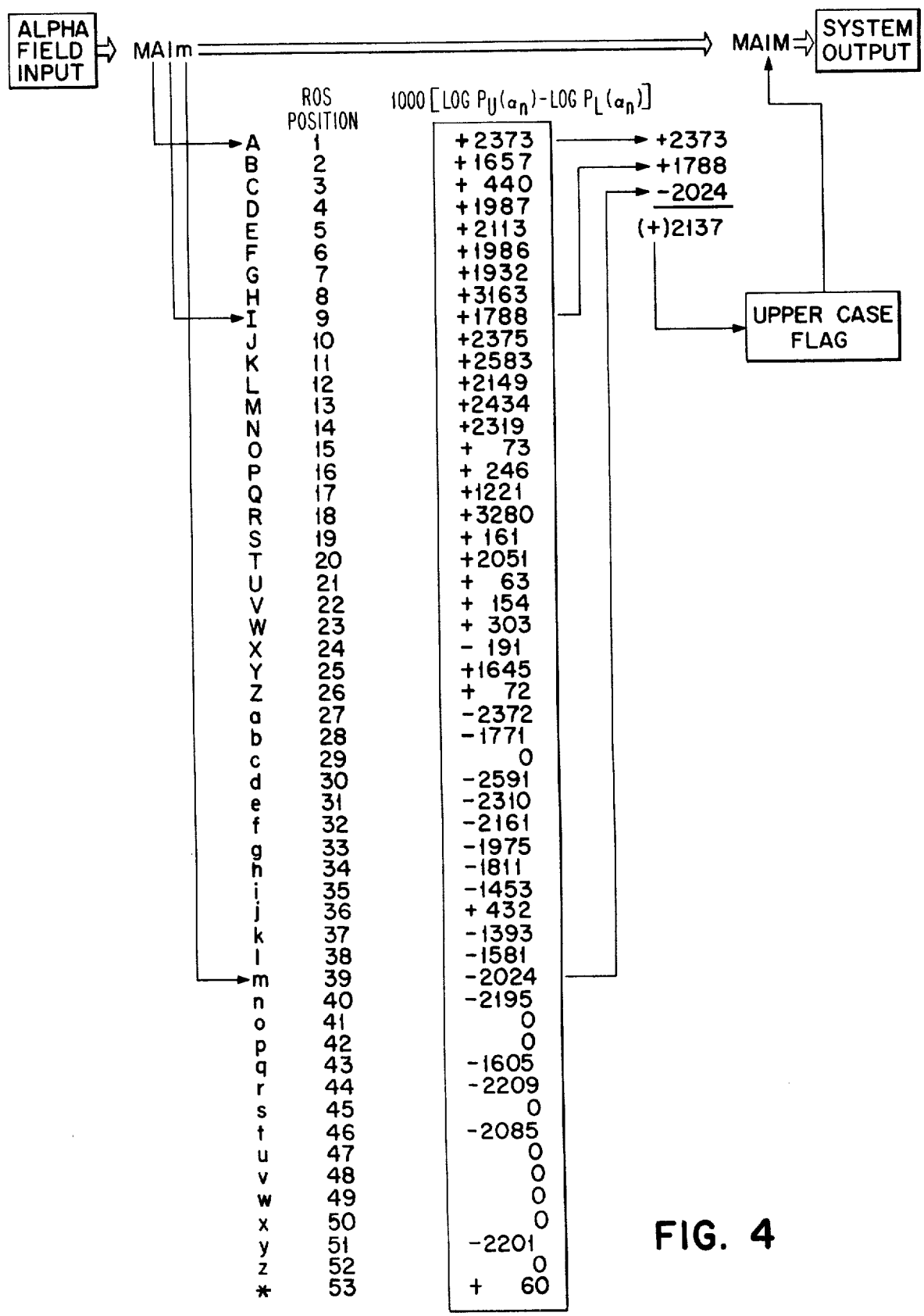
FIG. 4 displays diagrammatically an operation of the embodiment in FIG. 3.

The access and use of the read-only store embodiment operation is illustrated in FIG. 4. The input from the alpha field shift register 78 (see also FIG. 3) is the OCR alpha field with each character in the field represented by a numeric code. This numeric code is assigned to each character by its position in ka predefined alphabet, starting for example with upper case A = 1, and continuing sequentially through lower case z = 52. Additional special characters may also be similarly represented by higher numeric code numbers. The code is utilized for all OCR post processing to simplify computation. Persons skilled in this art will recognize that any code may be employed for the purpose of access to ROS 79, and that accordingly the code per se is not a critical part of this invention.

The example displayed in FIG. 4 shows an alpha word or field MAlm as having been provided by the OCR 71. This causes storage in the alpha field register 78 of the sequence (1, 9, 39) for the characters A, I, m, respectively. In accordance with equation (1), the first character of the alpha word or field is not included in the determination of the PCI value. The ROS 79 is arrayed in 52 or more sequential positions along a single axis. There is in each storge position a value which is the precomputed log of the ratio of the probability of a character $\alpha_i$ being an upper case font to the probability of $\alpha_i$ being a lower case font. For the example shown in FIG. 4, the indices 1, 9, and 39 are sequentially used to access ROS 79. Accordingly, the values +2373, +1788, and −2024 are read from ROS 79 and cummulatively summed utilizing the register 83, adder 84, and storage 85, respectively (see also FIG. 3).

The cummulative sum in buffer 86 for the example cited in connection with the operation displayed in FIG. 4 is +2137. The important characteristic of the value is the algebraic sign (i.e., the + or − polarity). A plus (+) sign indicates that the PCI value for the word or field is greater than unity (Log 1 = 0) with the implication that the original word read by the OCR was upper case. The sign is determined by outputting the value in storage 85 to the buffer 86 and along line 87 to the + or − polarity detector 88. If the detector senses a positive value, it will generate an upper case flag, and if it senses a negative value, it will generate a lower case flag. Accordingly, the field of characters sequentially transmitted from register 77 via line 97 to output register 88 and output line 89, will have upper or lower case flags consistent with the print convention case for the complete word. Accordingly, for the example in FIG. 4 discussed herein, the sequence of characters MAlm having had a PCI value +2137 will be output from the system output line 89 in FIG. 3, as MAIM. Control unit 92 (FIG. 3) effects a control corresponding to that of previously discussed control unit 44 (FIG. 2). Correspondingly, clear units 69 (FIG. 2) and 93 (FIG. 3) perform similar functions within their respective embodiment systems.

TABLE II

|      | A    | B    | C    | D    | E    | F    | G    | H    | I    | J    | K    | L    | M    | N    | O    | P    | Q   | R    | S    | T    |
|------|------|------|------|------|------|------|------|------|------|------|------|------|------|------|------|------|-----|------|------|------|
| 1 A  | 13   |      |      |      | 3602 | 4082 |      |      | 3482 | 4082 |      | 3482 | 3300 | 3602 |      | 4082 |     | 3482 |      | 3778 |
| 2 B  |      | 39   | 3252 | 2954 | 2348 | 3252 |      |      |      |      |      |      |      |      |      |      |     | 2553 |      | 2474 |
| 3 C  |      |      | 17   |      | 2796 |      | 3194 |      |      |      | 2893 | 2592 |      |      |      |      |     |      | 2893 |      |
| 4 D  |      | 3568 | 2169 | 53   | 2963 |      | 3568 |      | 3568 | 2964 | 3268 | 3268 | 3568 |      | 1362 | 2664 | 3568 | 3268 | 3568 | 3092 |
| 5 E  | 4046 | 4046 | 3125 | 4046 | 17   | 2446 |      |      | 3721 |      |      | 2704 | 3553 |      | 4046 |      |     | 3421 | 3721 |      |
| 6 F  |      |      |      |      |      | 28   |      | 2936 |      |      | 2936 |      |      | 2936 |      | 2456 |     | 2936 |      | 2936 |
| 7 G  |      |      | 2724 |      | 2900 |      | 17   |      |      |      |      |      |      |      |      |      |     |      | 3201 |      |
| 8 H  | 3509 | 3509 |      |      | 3509 |      |      | 21   | 3209 |      |      | 3509 | 2738 | 3509 |      | 3042 |     | 3042 | 3509 |      |
| 9 I  | 3700 |      |      |      | 3215 |      |      |      | 108  |      | 3700 | 2328 |      |      |      |      |     | 3700 |      | 2411 |
| 10 J | 3046 | 3046 |      |      |      |      |      |      |      | 30   |      |      |      |      |      | 3046 | 3046 |      |      |      |
| 11 K |      |      |      |      |      |      |      |      |      |      | 25   |      |      |      |      |      |     | 2940 |      |      |
| 12 L | 3482 |      | 3482 | 3958 | 3357 | 3958 |      |      | 2731 |      |      | 15   |      |      | 3953 |      |     |      | 3482 | 3357 |
| 13 M | 3252 |      |      |      | 2775 | 3432 |      | 2778 | 3252 |      | 2554 | 3721 |      | 50   | 2367 |      | 2951 |      | 3721 | 3432 | 3721 |
| 14 N | 3700 | 4000 |      |      |      | 3388 |      | 3388 |      |      | 4000 |      | 2268 | 24   |      | 3523 |     | 3388 | 4000 |      |
| 15 O |      | 3586 | 1684 | 1562 | 3585 |      | 3410 |      | 3886 | 3886 |      |      |      | 3886 | 50   | 3194 | 3586 | 3886 | 3586 | 3886 |
| 16 P |      |      | 3042 | 3042 |      | 2343 |      |      |      |      |      |      |      |      | 3347 | 3042 | 11  |      |      |      |
| 17 Q |      |      | 1794 |      |      |      |      |      |      |      |      |      |      |      |      | 478  | 288 |      |      |      |
| 18 R |      | 3959 | 3959 |      | 3638 | 3041 |      |      | 3348 | 3959 |      | 3168 | 3959 | 2743 | 3638 |      | 2904 |      | 23  | 3638 | 3959 |
| 19 S | 3922 | 3922 | 2890 | 3328 | 3922 |      | 3922 | 3922 |      |      |      |      | 3922 | 3638 | 3922 | 3554 |     |      | 12   |      |
| 20 T | 3824 |      |      | 3523 | 3824 |      |      |      | 2883 | 3824 |      | 3824 | 3824 | 3824 | 3824 |      |     | 3824 |      | 20   |
| 21 U |      |      |      |      |      |      |      | 3187 |      | 2708 |      | 2584 | 3187 | 3187 |      |      |     | 3187 |      |      |
| 22 V |      |      |      | 3087 | 2783 |      |      |      |      | 2783 |      | 3087 |      | 3087 |      |      |     |      |      | 3087 |
| 23 W |      |      |      |      |      | −    |      | 2584 | 3482 | 3482 |      |      | 2584 | 2144 | 3187 | 3482 |     |      | 3482 |      |
| 24 X | 3000 |      |      |      |      |      |      |      | 2697 |      | 1522 | 3000 |      |      |      |      |     |      | 3000 |      |
| 25 Y |      |      |      |      |      |      | 3168 |      | 3168 |      |      |      |      |      |      |      |     |      |      | 3168 |

Please Note:
A value of 5000 is ascribed to each blank position in this Table.

TABLE III

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| 26 Z | | | | | | | | | | | | | | | | | | | | |
| 27 a | 2300 | | | | | | 3252 | | | | | 3252 | | | 2954 | | | | | |
| 28 b | | | | 2186 | 2186 | | | | | | | | | | 2883 | | | | | |
| 29 c | | | 26 | | | | 2397 | | | | | | | | 2397 | | | | | |
| 30 d | | | | | | | | | | | | | | | | | | | | |
| 31 e | | 3377 | 2482 | | 2268 | | 3377 | | | | | | | | 2904 | | | 3377 | 3082 | |
| 32 f | | | | | | | | | | | | | | | | | | | | |
| 33 g | | | 2335 | | | | | | | | | | | | 2335 | | | | | |
| 34 h | | | | | | | | | | | | | | | | | | | | |
| 35 i | 3126 | | | | | | | | 2278 | | | 3126 | 3126 | | | | | | | |
| 36 j | | | | | | | | | | | | | | | | | | | | |
| 37 k | | | | | | | | | | | | | | | 2326 | | | | | |
| 38 l | | | | | | | 2660 | | | | | 2417 | | | | | | | | 2221 |
| 39 m | | | | | | | | | | | | | 2364 | | | | | | | |
| 40 n | 3250 | | 3250 | | | | | | | | | | | 2432 | 3250 | | | 2664 | | |
| 41 o | | | | 2079 | 2313 | | | | | | | | | | 36 | | | | | |
| 42 p | | | | | | | 2462 | | | | | 2462 | | | | 25 | | | 2858 | 3155 |
| 43 q | | | | | | | | | | | | | | | | | | | | |
| 44 r | | | | | 3260 | 2955 | 2955 | | | | | | | | | | | | | 3260 |
| 45 s | | 2293 | 2836 | | 2836 | | | | | | | | | | 2836 | | | | 33 | |
| 46 t | | 2996 | | | 2996 | | | | | | | 2396 | | | | | | | | |
| 47 u | | | | | | | | | | | | | 2506 | | | | | | | |
| 48 v | | | | | | | | | | | | | | 2270 | | | | | | |
| 49 w | | | | | | | | | | | | | | 2535 | | | | | | |
| 50 x | | | | | | | | | 2494 | | 2192 | | | | | | | | 2494 | |
| 51 y | | | | | 2582 | | | | | 2582 | | | | | | | | | | |
| 52 z | | | | | | | | | | | | | | | | | | | | |

Please Note:
A value of 5000 is ascribed to each blank position in this Table.

TABLE IV

| | U | V | W | X | Y | Z | a | b | c | d | e | f | g | h | i | j | k | l | m |
|---|---|---|---|---|---|---|---|---|---|---|---|---|---|---|---|---|---|---|---|
| 1 A | | | 3602 | 4082 | | 2500 | | | | 3478 | | | 4081 | | 3252 | | 4081 | | |
| 2 B | | | | | | | 2553 | | | 2951 | | | 3252 | | | | | | |
| 3 C | | | 3495 | | | | | | | 3495 | | | 3495 | | | | | | |
| 4 D | 2870 | | | | | | 3092 | 2867 | | 3268 | | | | | | | | | |
| 5 E | | | 3252 | | 4046 | 4027 | | | | 2558 | | | 4027 | 4027 | | | | | 4027 |
| 6 F | | | | | | | | | | | | 2932 | | | | | | | |
| 7 G | | | | | | | 3201 | | | 3201 | | | 3201 | | | | | 2900 | |
| 8 H | | 3509 | 3509 | | | | | | | | | | 2261 | 3509 | | | | | |
| 9 I | | | | 3700 | | 3700 | | | | | | | | 1448 | 3700 | | 1594 | | |
| 10 J | 2347 | | | | | | | | | | | | | | 2045 | | | | |
| 11 K | | | 3237 | 3237 | | | | | | | | | | | | 2008 | | | |
| 12 L | 3958 | | | | | | | | | | | | | 3114 | | | 3959 | 2358 | |
| 13 M | | 3721 | 3125 | 3721 | | | | | | | | 3731 | 3252 | 3252 | | | 3431 | 3731 | 2686 |
| 14 N | | | 3092 | 4000 | | | | | | | | | 3996 | 3693 | | | | 3693 | 3693 |
| 15 O | 2323 | | 3586 | | | 3415 | 3893 | | | 3192 | | | 3843 | 3843 | 3843 | 3843 | | | 3843 |
| 16 P | | | | 3347 | 3347 | | | | | | | | | 3343 | | | | | |
| 17 Q | | | | | | 3000 | | | | | | | | | | | | | |
| 18 R | 3959 | | 3959 | | 3959 | 3947 | | | | | | | 3947 | 3468 | | | 2833 | 3947 | 3646 |
| 19 S | | | | | | | 3932 | | | | | | | 3932 | | 3932 | | | |
| 20 T | | 3357 | | 3357 | | | | | | | | | | 2793 | | | | 2421 | 3836 |
| 21 U | 24 | | 2886 | 2886 | | | 3187 | | | | | | | | | | | | |
| 22 V | 3087 | 22 | 2386 | | 2608 | | | | | | | | | | | | | | |
| 23 W | | | 40 | | | | | | | | | | | 2788 | | | 3487 | | |
| 24 X | 2697 | | | 79 | 3000 | | | | | | | | | | | | | | |
| 25 Y | | 2024 | | | 20 | | | | | | | | | 3170 | | | | | |

Please Note:
A value of 5000 is ascribed to each blank position in this Table.

TABLE V

| | U | V | W | X | Y | Z | a | b | c | d | e | f | g | h | i | j | k | l | m |
|---|---|---|---|---|---|---|---|---|---|---|---|---|---|---|---|---|---|---|---|
| 26 Z | | | | | | 22 | | | | | | | | | | | | | |
| 27 a | | | | | | | 25 | | | | 2783 | | | 3084 | | | | | |
| 28 b | | | | | | | | 36 | 26 | 2397 | 2397 | | | 1708 | | | | | |
| 29 c | | | | | | | | | | | | | | | | | | | |
| 30 d | | | | | | 2191 | | | | 40 | | | | | | | | | |
| 31 e | | | 3082 | | | 2780 | | | | | 20 | | | | | | | 3377 | 3377 |
| 32 f | | | | | | | | | | | 1870 | 85 | | | | | | | |
| 33 g | | | 2335 | | | | | | | | | | 73 | | | | | | |
| 34 h | | | | | | | | | | | | | | 15 | 2435 | | | | |
| 35 i | 2822 | | | 3126 | | | | | | | | | | | 38 | | | 1443 | |
| 36 j | | | | | | | | | | | | | | | | 600 | | | |
| 37 k | | | 2326 | | | | | | | | | | | | | | 21 | | |
| 38 l | | | | | 3620 | 3263 | | | | | 3263 | | | 1564 | | | | 55 | |
| 39 m | | | | | | | | | | | | | | | | | | | 46 |
| 40 n | | | | | | | | | | | 3336 | | 3336 | 2734 | | | | 2861 | |
| 41 o | | | | | 2857 | 2857 | | | | | 2857 | | | | | | | 3158 | |
| 42 p | | | | | | | | | | | | | | | | | | | |
| 43 q | | | | | | | | | | | | | 1000 | | | | | | |
| 44 r | | | 2955 | 3260 | | | | | | | | | | | 3260 | | | | |
| 45 s | | | | | | 2536 | | | | | 2662 | | 2839 | | | | | | |

TABLE V-continued

|     | U    | V    | W   | X    | Y    | Z    | a | b | c | d    | e    | f | g | h    | i    | j | k | l    | m    |
|-----|------|------|-----|------|------|------|---|---|---|------|------|---|---|------|------|---|---|------|------|
| 46 t |     |      |     |      |      |      |   |   |   | 2996 | 2996 |   |   |      | 2996 |   |   |      |      |
| 47 u | 50  | 2506 |     |      |      | 2508 |   |   |   | 2508 |      |   |   | 2508 | 1810 |   |   |      |      |
| 48 v |     | 32   |     |      |      |      |   |   |   |      |      |   |   |      |      |   |   |      |      |
| 49 w |     | 2234 | 43  |      |      |      |   |   |   |      |      |   |   |      |      |   |   |      | 1967 |
| 50 x |     |      |     | 37   | 2494 |      |   |   |   |      |      |   |   |      |      |   |   | 2494 |      |
| 51 y |     | 1736 |     |      | 1805 |      |   |   |   |      |      |   |   |      |      |   |   |      |      |
| 52 z |     |      |     | 1435 |      | 43   |   |   |   |      |      |   |   |      |      |   |   | 3000 |      |

Please Note:
A value of 5000 is ascribed to each blank position in this Table.

TABLE VI

|      | n    | o | p | q   | r    | s | t    | u | v | w | x | y    | z    | *    | No.  | at   | ?    |
|------|------|---|---|-----|------|---|------|---|---|---|---|------|------|------|------|------|------|
| 1 A  | 4081 |   |   |     |      |   |      |   |   |   |   |      |      | 2155 | 2064 | 3155 | 4000 |
| 2 B  |      |   |   |     |      |   |      |   |   |   |   |      |      | 1370 | 2137 | 3155 | 4000 |
| 3 C  |      |   |   |     | 3495 |   |      |   |   |   |   |      |      | 1830 | 2432 | 3155 | 4000 |
| 4 D  | 2722 |   |   |     |      |   | 3569 |   |   |   |   |      |      | 1519 | 2009 | 3097 | 4000 |
| 5 E  |      |   |   |     | 3550 |   | 3425 |   |   |   |   |      |      | 1752 | 2958 | 3155 | 4000 |
| 6 F  |      |   |   |     | 2455 |   |      |   |   |   |   |      |      | 1700 | 1824 | 3155 | 4000 |
| 7 G  |      |   |   |     |      |   |      |   |   |   |   |      |      | 1676 | 2456 | 3155 | 4000 |
| 8 H  | 3509 |   |   |     |      |   | 3509 |   |   |   |   |      |      | 2156 | 1786 | 3155 | 4000 |
| 9 I  |      |   |   |     | 3215 |   |      |   |   |   |   |      |      | 1518 | 2237 | 1013 | 1936 |
| 10 J |      |   |   |     |      |   |      |   |   |   |   |      | 3046 | 1587 | 1936 | 2543 | 4000 |
| 11 K | 3237 |   |   |     |      |   |      |   |   |   |   |      |      | 2328 | 1826 | 3155 | 4000 |
| 12 L |      |   |   |     | 3482 |   | 3458 |   |   |   |   |      |      | 1944 | 2638 | 2482 | 3301 |
| 13 M |      |   |   |     | 3731 |   |      |   |   |   |   | 3731 |      | 1842 | 1212 | 3155 | 4000 |
| 14 N | 2652 |   |   |     |      |   |      |   |   |   |   |      |      | 2678 | 1550 | 3522 | 4000 |
| 15 O | 2688 |   |   |     | 3843 |   |      |   |   |   |   | 3843 |      | 1668 | 1827 | 3155 | 4000 |
| 16 P |      |   |   |     | 3343 |   |      |   |   |   |   |      |      | 2149 | 2538 | 3155 | 4000 |
| 17 Q |      |   |   | 794 |      |   |      |   |   |   |   |      |      | 1367 | 1668 | 3155 | 4000 |
| 18 R | 2867 |   |   |     | 2448 |   | 3646 |   |   |   |   |      |      | 2114 | 1687 | 3522 | 4000 |
| 19 S |      |   |   |     |      |   |      |   |   |   |   |      |      | 1877 | 3523 | 3155 | 4000 |
| 20 T |      |   |   |     | 2992 |   | 2475 |   |   |   |   | 3836 |      | 2137 | 1830 | 3222 | 4000 |
| 21 U |      |   |   |     |      |   |      |   |   |   |   |      |      | 2042 | 1632 | 2886 | 4000 |
| 22 V |      |   |   |     |      |   |      |   |   |   |   | 3084 |      | 2853 | 1564 | 3155 | 4000 |
| 23 W |      |   |   |     |      |   |      |   |   |   |   | 3487 |      | 2421 | 1226 | 3155 | 4000 |
| 24 X |      |   |   |     |      |   |      |   |   |   |   |      |      | 1788 | 1034 | 3155 | 4000 |
| 25 Y |      |   |   |     |      |   |      |   |   |   |   | 2569 |      | 2237 | 1733 | 3155 | 4000 |

Please Note: A value of 5000 is ascribed to each blank position in this Table.

TABLE VII

|      | n    | o  | p  | q   | r    | s  | t    | u  | v  | w  | x  | y    | z  | *    | No.  | at   | ?    |
|------|------|----|----|-----|------|----|------|----|----|----|----|------|----|------|------|------|------|
| 26 Z |      |    |    |     |      |    |      |    |    |    |    |      |    | 1442 | 1442 | 3155 | 4000 |
| 27 a | 3084 |    |    |     |      |    |      |    |    |    |    | 3384 |    | 1523 | 1420 | 3155 | 4000 |
| 28 b |      |    |    |     |      |    |      |    |    |    |    |      |    | 1407 | 2402 | 3155 | 4000 |
| 29 c |      |    |    |     |      |    |      |    |    |    |    |      |    | 2328 | 1552 | 3155 | 4000 |
| 30 d | 2668 |    |    |     |      |    |      |    |    |    |    |      |    | 1209 | 2586 | 3155 | 4000 |
| 31 e |      |    |    |     |      |    |      |    |    |    |    |      |    | 1678 | 3046 | 3155 | 4000 |
| 32 f |      |    |    |     | 1870 |    |      |    |    |    |    |      |    | 1695 | 1209 | 3155 | 4000 |
| 33 g |      |    |    | 2334|      |    |      |    |    |    |    |      |    | 958  | 2000 | 3155 | 4000 |
| 34 h | 2435 |    |    |     |      |    |      |    |    |    |    |      |    | 2600 | 1794 | 3155 | 2388 |
| 35 i |      |    |    |     |      |    |      |    |    |    |    |      |    | 1637 | 2087 | 3155 | 2794 |
| 36 j |      |    |    |     |      |    |      |    |    |    |    |      |    | 300  | 1000 | 3155 | 4000 |
| 37 k |      |    |    |     |      |    |      |    |    |    |    |      |    | 1549 | 2222 | 3155 | 4000 |
| 38 l |      |    |    |     |      |    |      |    |    |    |    |      |    | 1522 | 1658 | 2886 | 1886 |
| 39 m | 1550 |    |    |     |      |    |      |    |    |    |    |      |    | 1448 | 1925 | 3155 | 4000 |
| 40 n |      | 21 |    |     | 2861 |    |      |    |    |    |    |      |    | 2009 | 1760 | 3155 | 4000 |
| 41 o |      | 36 |    |     |      |    |      |    |    |    |    |      |    | 1864 | 1706 | 3155 | 4000 |
| 42 p |      |    | 25 |     |      |    |      |    |    |    |    |      |    | 1522 | 1103 | 3155 | 4000 |
| 43 q |      |    |    | 156 |      |    |      |    |    |    |    |      |    | 1000 | 1000 | 3155 | 4000 |
| 44 r |      |    |    |     | 22   |    | 3260 |    |    |    |    |      |    | 1939 | 1765 | 3155 | 4000 |
| 45 s |      |    |    |     |      | 33 |      |    |    |    |    |      |    | 1524 | 2301 | 3155 | 4000 |
| 46 t |      |    |    |     | 2996 |    | 24   |    |    |    |    |      |    | 1662 | 2143 | 3155 | 4000 |
| 47 u |      |    |    |     |      |    |      | 50 |    |    |    |      |    | 1428 | 1736 | 3155 | 4000 |
| 48 v |      |    |    |     |      |    |      |    | 32 |    |    |      |    | 2155 | 1425 | 3155 | 4000 |
| 49 w | 2535 |    |    |     | 2535 |    |      |    |    | 43 |    |      |    | 2276 | 1208 | 3155 | 4000 |
| 50 x |      |    |    |     |      |    |      |    |    |    | 37 |      |    | 1830 | 1522 | 3155 | 4000 |
| 51 y |      |    |    |     | 2583 |    |      |    |    |    |    | 38   |    | 2023 | 1715 | 3155 | 4000 |
| 52 z |      |    |    |     |      |    |      |    |    |    |    |      | 43 | 1639 | 1639 | 3155 | 4000 |

Please Note:
A value of 5000 is ascribed to each blank position in this Table.

While the invention has been particularly shown and described with reference to the preferred embodiments thereof, it will be understood by those skilled in the art that the foregoing and other changes in form and details may be made therein without departing from the spirit and scope of the invention.

We claim:

1. An apparatus for discriminating upper and lower case alphabetic character fields appearing on the output line of an optical character recognition machine (OCR) as a series of character defining electrical signals, comprising:

a read-only store having an input and an output, said store containing respective upper and lower case $P_U(\alpha_n)$ and $P_L(\alpha_n)$ print convention probability values therein for conflict, reject and alphabetic characters outputted by the OCR and in accordance with the equations $$P_U(\alpha_n) = \sum_{i=1}^{26} P_c\left[\alpha_n | U(i)\right] \cdot P[U(i)] \text{ and } P_L(\alpha_n) =$$

$$\sum_{i=1}^{26} P_c\left[\alpha_n | L(i)\right] \cdot P[L(i)]$$

where $P_U(\alpha_n)$ is representative of the probability tht said OCR recognition ($\alpha_n$) resulted from the scan of an upper case alphabetic character; $P_L(\alpha_n)$ is representative of the probability that said OCR recognition ($\alpha_n$) resulted from the scan of a lower case alphabetic character; $U(i)$ is the 1-26 ith upper case alphabetic character; $L(i)$ is the 1-26 ith lower case alphabetic character; $P_c[\alpha_n|U(i)]$ is the confusion probability of $U(i)$ being read as $\alpha_n$; $P[U(i)]$ is the probability of $U(i)$ occurring on the document scanned by said OCR in view of the language of the field of characters inscribed on the aforesaid document; $P_c[\alpha_n|L(i)]$ is the confusion probability of $L(i)$ being read as $\alpha_n$; and $P[L(i)]$ is the probability of $L(i)$ occurring on the document scanned by said OCR in view of the language of the field of characters inscribed on the aforesaid document;

first circuit means connected said OCR output line to the input of said store whereby a sequence of signals indicative of a field of characters outputted by said OCR, address said store serially a character at a time, to thereby make available serially at said store output, probability values corresponding to the aforesaid serially outputted character signals;

an adder having an input and an output;

second circuit means connecting said store output to the input of said adder, whereby probability values corresponding to the aforesaid serially outputted character signals are added algebraically;

and last means connected to the output of said adder to detect the polarity of the print convention probability value algebraic sum following the read-out by said OCR to said store of all characters within a field, to thereby designate the upper/lower case print convention of the characters within the field.

2. An apparatus according to claim 1 additionally comprising a gate-buffer for storing coded signals representative of the field of characters outputted by said OCR; control means for effecting a transfer of said signals to said gate-buffer substantially concurrently with the development of the print convention probability value algebraic sum; and means controlled by the aforesaid last means to be responsive to the polarity of the probability value algebraic sum for appending an upper or a lower case flag to the character field stored in said gate-buffer consequent upon said polarity being plus or minus.

3. A process for discriminating upper and lower case character fields appearing on the output line of an OCR as a series of character defining electrical signals, comprising the steps of:

storing in a read-only store respective upper and lower case $P_U(\alpha_n)$ and $P_L(\alpha_n)$ print convention probability values for characters outputted by the OCR and in accordance with the equations $$P_U(\alpha_n) = \sum_{i=1}^{26} P_c\left[\alpha_n | U(i)\right] \cdot P[U(i)] \text{ and } P_L(\alpha_n) =$$

$$\sum_{i=1}^{26} P_c\left[\alpha_n | L(i)\right] \cdot P[L(i)]$$

where $P_U(\alpha_n)$ is representative of the probability that said OCR recognition ($\alpha_n$) resulted from the scan of an upper case alphabetic character; $P_L(\alpha_n)$ is representative of the probability that said OCR recognition ($\alpha_n$) resulted from the scan of a lower case alphabetic character; $U(i)$ is the 1-26 ith upper case alphabetic character; $L(i)$ is the 1-26 ith lower case alphabetic character; $P_c[\alpha_n|U(i)]$ is the confusion probability of $U(i)$ being read as $\alpha_n$; $P[U(i)]$ is the probability of $U(i)$ occuring on the document scanned by said OCR in view of the language of the field of characters inscribed on the aforesaid document; $P_c[\alpha_n|L(i)]$ is the confusion probability of $L(i)$ being read as $\alpha_n$; and $P[L(i)]$ is the probability of $L(i)$ occurring on the document scanned by said OCR in view of the language of the field of characters inscribed on the aforesaid document;

addressing the input of said read-only store with said series of electrical signals so as to produce at the output of said read-only store, probability values corresponding to character defining electrical signals applied to the input;

detecting blank character positions between adjacent characters outputted by the OCR so as to group a series of electrical signals within a character field between two successive blank character positions;

adding algebraically the probability values for character defining electrical signals within a character field; and detecting the polarity of the print convention probability value algebraic sum to thereby designate the upper/lower case print convention of the characters within the character field.

4. A process according to claim 3 additionally including the steps of storing a field of character defining electrical signals in a buffer connected to the OCR output line, and flagging the character field in the buffer upper or lower case print convention consequent upon the polarity of the print convention probability value algebraic sum.

5. A process for discriminating upper and lower case character fields appearing on the output line of an OCR as a series of character defining electrical signals, comprising the steps of:

storing in a first storage unit case $P_U(\alpha_n)$ print convention probability values for characters outputted by the OCR;

storing in a second storage unit lower case $P_L(\alpha_n)$ print convention probability values for characters outputted by the OCR;

said print convention probability values being stored in accordance with the equations $$P_U(\alpha_n) = \sum_{i=1}^{26} P_c\left[\alpha_n | U(i)\right] \cdot P[U(i)] \text{ and } P_L(\alpha_n) =$$

-continued $$\sum_{i=1}^{26} P_c \left[ \alpha_n | L(i) \right] \cdot P[L(i)]$$

where $P_U(\alpha_n)$ is representative of the probability that said OCR recognition $(\alpha_n)$ resulted from the scan of an upper case alphabetic character; $P_L(\alpha_n)$ is representative of the probability that said OCR recognition $(\alpha_n)$ resulted from the scan of a lower case alphabetic character; $U(i)$ is the 1–26 $i$th upper case alphabetic character; $L(i)$ is the 1–26 $i$th lower case alphabetic character; $P_c[\alpha_n|U(i)]$ is the confusion probability of $U(i)$ being read as $\alpha_n$; $P[U(i)]$ is the probability of $U(i)$ occurring on the document scanned by said OCR in view of the language of the field of characters inscribed on the aforesaid document; $P_c[\alpha_n|L(i)]$ is the confusion probability of $L(i)$ being read as $\alpha_n$; and $P[L(i)]$ is the probability of $L(i)$ occurring on the document scanned by said OCR in view of the language of the field of characters inscribed on the aforesaid document;

addressing the inputs of said first and said second storage units with said series of electrical signals so as to produce at the outputs of said first and said second storage units, upper and lower case probability values, respectively, corresponding to character defining electrical signals applied to the aforesaid inputs;

detecting blank character positions between adjacent characters outputted by the OCR so as to group a series of electrical signals within a character field between two successive blank character positions;

adding the upper case probability values appearing at the output of said first storage unit;

adding the lower case probability values appearing at the output of said second storage unit;

inverting one of the aforesaid probability value sums;

comparing the other one of the aforesaid probability value sums with the inverted sum to thereby designate by + and − algebraic sign the upper and lower case print convention, respectively, of the characters within the character field; and flagging the character field print convention in accordance with the algebraic sign notation.

6. An apparatus for discriminating upper and lower case alphabetic character fields appearing on the output line of an optical character recognition machine (OCR) as a series of electrical signals, comprising: A first store having an input and an output, said first store containing upper case $P_U(\alpha_n)$ print convention probability values therein for conflict, reject and alphabetic characters outputted by the OCR and in accordance with the equation $$P_U(\alpha_n) = \sum_{i=1}^{26} P_c[\alpha_n|U(i)] \cdot P[U(i)]$$

where $P_U(\alpha_n)$ is representative of the probability that said OCR recognition $(\alpha_n)$ resulted from the scan of an upper case alphabetic character; $U(i)$ is the 1–26 $i$th upper case alphabetic character; $P_c[\alpha_n|U(i)]$ is the confusion probability of $U(i)$ being read as $\alpha_n$; $P[U(i)]$ is the probability of $U(i)$ occurring on the document scanned by said OCR in view of the language of the field of characters inscribed on the aforesaid document; a second store having an input and an output, said second store containing lower case $P_L(\alpha_n)$ print convention probability values therein for conflict, reject and alphabetic characters outputted by the OCR and in accordance with the equation $$P_L(\alpha_n) = \sum_{i=1}^{26} P_c[\alpha_n|L(i)] \cdot P[L(i)]$$

where $P_L(\alpha_n)$ is representative of the probability that said OCR recognition $(\alpha_n)$ resulted from the scan of a lower case alphabetic character; $L(i)$ is the 1–26 $i$th lower case alphabetic character; $P_c[\alpha_n|L(i)]$ is the confusion probability of $L(i)$ being read as $\alpha_n$; and $P[L(i)]$ is the probability of $L(i)$ occurring on the document scanned by said OCR in view of the language of the field of characters inscribed on the aforesaid document; first circuit means connecting said OCR output line to the inputs of said first and second stores whereby a sequence of signals indicative of a field of characters outputted by said OCR, address said stores serially a character at a time, to thereby make available serially at each of said first and second store outputs, print convention probability values corresponding to the aforesaid serially outputted character signals; a first adder having an input and an output; second circuit means connecting said first store output to the input of said first adder, whereby upper case print convention probability values corresponding to the aforesaid serially outputted character signals are added algebraically in said first adder; a second adder having an input and an output; third circuit means connecting said second store output to the input of said second adder, whereby lower case print convention probability values corresponding to the aforesaid serially outputted character signals are added algebraically in said second adder; an inverter connected to the output of said second adder, and an algebraic probability value comparator connected to the output of said first adder and to the output of said inverter so as to detect the polarity of the print convention probability value algebraic sum comparison following the read-out by said OCR to said first and said second stores of all characters within a field, and to thereby designate the upper/lower case print convention of the characters in the field.

7. an apparatus according to claim 6 additionally comprising a gate-buffer for storing coded signals representative of the field of characters outputted by said OCR; control means for effecting a transfer of said signals to said gate-buffer substantially concurrently with the development of the print convention probability value algebraic sum; and means controlled by said comparator, responsive to the polarity of the probability value algebraic sum therefrom, for appending an upper or a lower case flag to the character field stored in said gate-buffer consequent upon the polarity output from said comparator.

* * * * *